July 19, 1966  W. V. KARR  3,261,401
WATER PRODUCTION
Filed Nov. 20, 1963  2 Sheets-Sheet 1
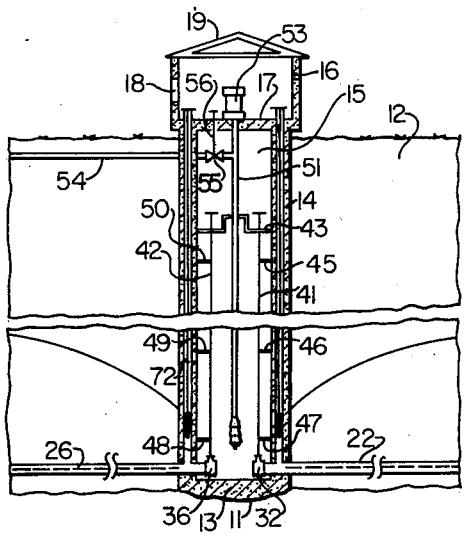
FIG. I
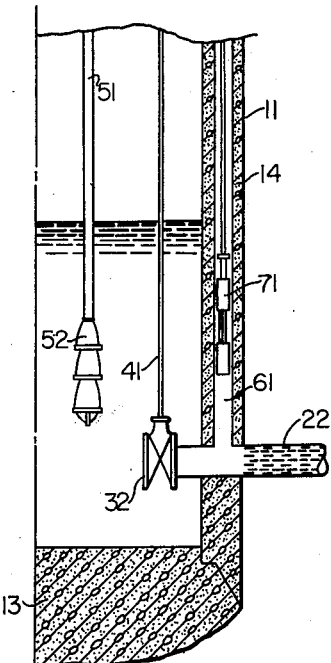
FIG. 2
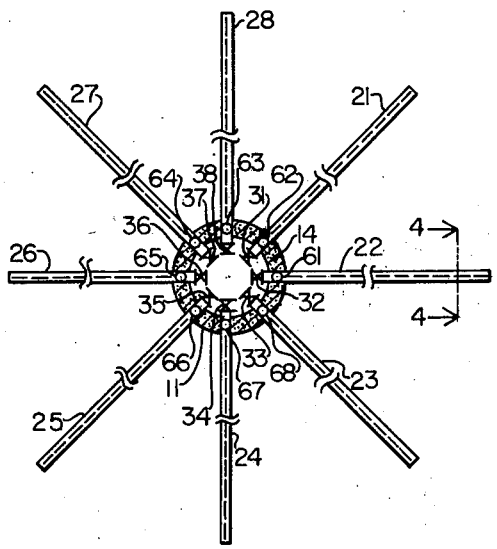
FIG. 3
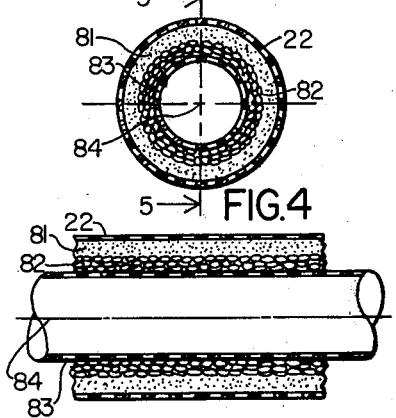
FIG. 4
FIG. 5
INVENTOR.
WILLIAM V. KARR
BY
ATTORNEY
JEROME R. COX July 19, 1966  W. V. KARR  3,261,401
WATER PRODUCTION Filed Nov. 20, 1963  2 Sheets-Sheet 2

INVENTOR.
WILLIAM V. KARR
BY Jerome R. Box
ATTORNEY

United States Patent Office 3,261,401
Patented July 19, 1966

---

3,261,401
WATER PRODUCTION
William V. Karr, 2270 Bryden Road, Bexley 9, Ohio
Filed Nov. 20, 1963, Ser. No. 324,983
12 Claims. (Cl. 166—50)

The invention disclosed in this application relates in general to the supply of water. The embodiments of the invention illustrated and specifically described comprise water plants of a new design combining features of horizontal wells and features of vertical wells. These embodiments constitute new designs in water plants. These designs have wide application in systems for the economical large (and even small) supply of quality controlled water to satisfy the needs in any industry or city.

Prior hereto wells have been largely of two general types. The first type is the traditional vertical well in which a pipe is driven (often for a relatively long distance) vertically into the ground and draws water from the soil surrounding the lower end of the vertical pipe which must be substantially vertically below the area from which the pipe is driven. Also horizontal wells (also known as radial wells or Ranney Collectors) have been heretofore largely used. A horizontal well (or radial well) is usually and traditionally a large diameter vertical caisson with horizontal screen pipes (laterals) projecting radially outward from the bottom of the caisson. Each horizontal screen pipe is perforated with oblong openings and slotted to size according to the sand and gravel content of the water bearing formation. The length of each horizontal screen pipe also varies depending upon the water bearing formation and upon the quality and quantity requirements.

I have, however, made improvements in such horizontal wells which provide not only the traditional advantages of horizontal wells but also many other advantages not heretofore possible even with horizontal wells.

Objects

One of the objects of my invention is the provision of a new design of a water plant for the provision of the economical large and small supply of quality controlled water.

A further object is the provision of a water supply plant which is of maximum efficiency and which can be constructed and maintained at relatively low cost.

A further object of my invention is the provision of a water supply system capable of solving a wide range of water problems pertaining to the quality of the water desired as well as to the quantity.

A further object of my invention is the provision of a water plant supply system combining valuable features of horizontal wells and vertical wells.

A further object of my invention is the provision of a well system with a large area of openings allowing water to enter the system at a relatively low velocity which minimizes incrustation of screens and allows maximum draw down and full utilization of aquifer capacity.

A further object of my invention is the provision of a new water plant creating a revolutionary water control center which will produce cool, clear water in large quantities, utilizing the principles of horizontal radial wells and of vertical wells in conjunction with a caisson.

A further object of my invention is the provision of a multi-purpose water plant by which I achieve effectively better quality, more water, more flexibility, new blending techniques, a program of preventative maintenance without any shut-down time, and lower installation and operation costs.

Features of the embodiments of my invention disclosed herein include the installation of process tube lines within the walls of the caisson at the time of construction and the provision of new precast coarse sand and gravel by size packed laterals wherein the packing is within the walls of the lateral.

A further feature of the embodiments of my invention shown is the provision of means to inject used water directly into the aquifer through a non-perforated radial pipe at a height best suited.

Further objects and features of my invention include the utilization of a novel construction for economical installation and central operation; the continuous operation of a well without maintenance shut-downs; water conservation by injecting water back into the aquifer and the blending of surface, underground, river, salt water, chemicals mixed with water, and/or used water from the plant; control of quantity available when combined with a utilized river intake; control of quality; the optional use of a unitized storage or treatment tank surrounding upper structure and the caisson itself.

Further features and objects of the invention will be apparent from the following specification and claims when considered in connection with the accompanying drawings illustrating embodiments of my invention.

In the drawings:

FIG. 1 is a fragmentary view in vertical section of a deep well caisson illustrating one embodiment of my invention;

FIG. 2 is a fragmentary view of the caisson of FIG. 1, in vertical section, on a larger scale, and illustrating further a portion of the well shown in FIG. 1;

FIG. 3 is a partly diagrammatic and fragmentary view illustrating as if in horizontal section taken along a line just above the radial horizontal screen pipes a portion of the well shown in FIGS. 1 and 2;

FIG. 4 is a view in vertical section and on a much larger scale taken substantially on the line 4—4 of FIG. 3;

FIG. 5 is a view in vertical section taken substantially on the line 5—5 of FIG. 4;

Detailed description

Figure 6:
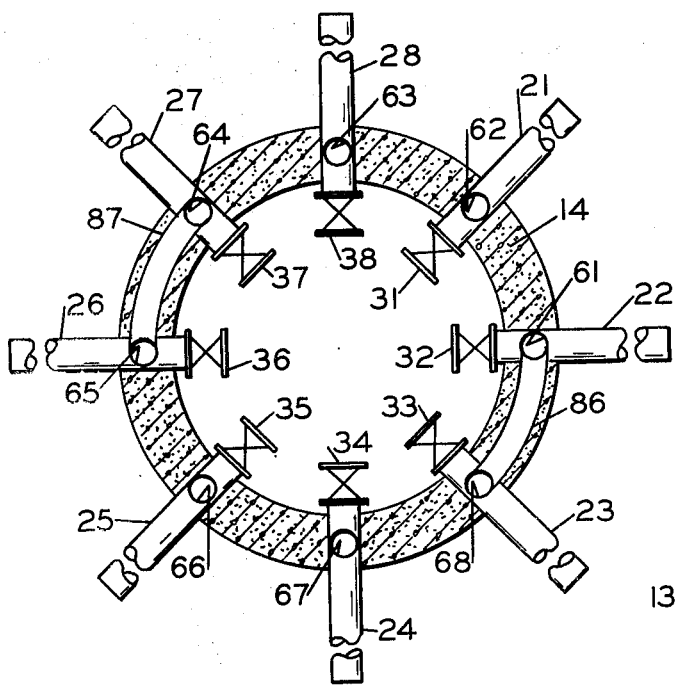
FIG. 6 is a view similar to FIG. 3 except that FIG. 6 illustrates a second embodiment of the invention.

Referring now especially to FIGS. 1, 2 and 3, it may be seen that I have shown a deep well caisson 11 constructed in the earth 12, having a bottom plug 13, substantially circular sidewalls 14, and an interior 15. Constructed over the well 11 is a pump house 16 having a floor 17, sidewalls 18, and a roof 19. Within the interior 15 of the caissons are extended the inner ends of the horizontal radially projecting screen pipes (laterals) 21, 22, 23, 24, 25, 26, 27 and 28. At the inner end of each of these pipes there is provided a valve such as the valves 31, 32, 33, 34, 35, 36, 37 and 38. These valves are controlled by valve stems or control rods such as the rods 41 and 42, a valve stem being provided for each of the valves 31–38 inclusive. These valve stems all extend upward to positions at which they may be conveniently operated for the control of the valves 31–38 inclusive. Thus the valve stems controlling rods 41 and 42 extend upward and through a platform 43 on which an operator may stand to operate said valve stems. The floor 17 is provided with a door through which an operator may descend into the well to the platform 43. Stays or braces such as 45, 46, 47, 48, 49 and 50 are provided for bracing and supporting each of the valve stems. Stems for valves 33, 34 and 35 extend upward through the platform 17 so that they may be operated by an operator in the pump house itself. Rods for valves 31, 32, 36, 37 and 38 extend upward only to the platform 43 and may be there operated. A deep well turbine pump 51 is also provided in the space 15. This pump 51 has impellers 52 at its lower end, these impellers being driven by the combined motor and pump 53 in the pump house.

Extending radially outward from the casing of the pump 51 is a solid pipe 54 having no opening except at the tip. This pipe 54 is provided for the purposes of (1) injecting used water into the aquifer for further filtering and reuse, (2) waste disposal, and (3) intake of water as from a river. An auxiliary pump in the combined motor and pump 53 operates either as an intake pump when the line 54 is used for intake purposes or as an output pump when the line 54 is used for waste disposal or for injection into the aquifier. A valve 55 controls the line 54 and is in turn controlled by a valve stem 56 which may be operated in the pump house 16.

The walls 14 of the caisson 11 are formed with a plurality of vertically extending tubular openings or tubes such as the tubes 61, 62, 63, 64, 65, 66, 67 and 68 into each of which there extends a submersible pump such as the submersible pumps 71 and 72. These vertical tubes constitute individual process lines, one being provided for each lateral.

In alternate embodiments, I provide vertically extending pipes just inside or outside of the caisson walls, each connected at its lower end with one of the laterals 21–28 inclusive and each containing a submersible pump such as the pumps 71 and 72.

Each of the radially projecting horizontal screen pipes (laterals) is internally packed with suitable materials such as for example, gravel and coarse sand. The gravel and sand may fill the entire space within the radially extending horizontal perforated screen pipe, but I prefer as shown in FIGS. 4 and 5 to pack the sand 81 and the gravel 82 between the inner face of the slotted pipe 22 and a concentric inner screen 83 so that the incoming water may flow easily through the screen formed by the pipe 22 then through the sand 81 and the gravel 82, then through the inner screen 83 to the space 84 and thence to the vertical space of the opening 61 where it is pumped to the surface by the submersible pump 71 with the valve shut-off inside of the caisson.

Water coming in as from a river through the lateral 54 may, if desired, flow down through an external concentric space of the casing of the deep well pump 51 into the bottom of the caisson and there be blended with purified water coming in through the laterals 21–28 inclusive, forming by the blending, a water which is not as pure as the water coming in through laterals 21–28 inclusive, but which is purer than the raw water taken direct from the river. Alternately the lateral 54 may be used for waste disposal or for the injection of used water (as for example, water which has been used for cooling purposes and is therefore pure, but is too warm for further immediate use) to be injected into the aquifer and again purified and cooled and brought back through the laterals 21–28 inclusive.

Figure 8:
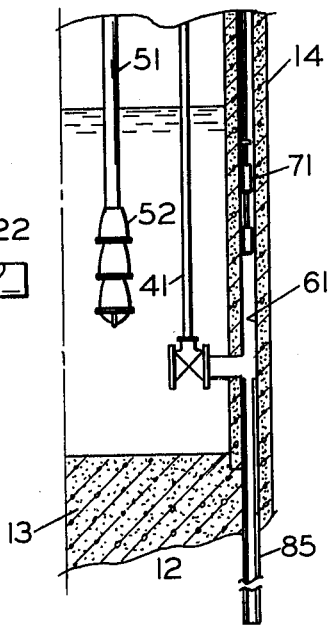
FIG. 8 is a view similar to FIG. 2 except that FIG. 8 illustrates a fourth embodiment of the invention.

In a further embodiment of my invention I extend some of the tubular openings 61 to 68 as for example tubular openings 66, 67 and 68 inclusive on downward through the bottom of the caisson and through the plug 13 and down into the soil for any desired distance to form a true vertical deep well pumping system so that all of the soil beneath the pump house, as well as all of the soil adjacent the surface extending outward for substantial distances, such as for example, hundreds of feet, from the pumping station may be utilized. In such case, the corresponding lateral of the series 21 to 28 inclusive is closed either by a plug or by a valve adjacent the point at which it enters the caisson. Thus I have shown in FIG. 8 a deep well pipe 85 extending downwardly from the tubular opening 61. Pipe 85 extends through the bottom plug 13 into the earth 12. A submersible pump 71 is shown in opening 61 in FIG. 8 but, if necessary, this may be replaced by a deep well turbine pump (not shown).

I have thus developed a new concept in the design of a water plant by combining features of horizontal wells and vertical wells. This should have wide application in the economical large or small supply of quality controlled water to satisfy the needs of any industry or city.

The outstanding feature of the new design is flexibility and conservancy of various types of water.

A horizontal well (also known as radial well or Ranney collector), as they are often called, is a large diameter vertical caisson with a plurality of horizontal inlets each formed of horizontal screen pipe projecting radially outward from the bottom of the caisson. Traditionally, the vertical caisson has had a thirteen foot inside diameter and reinforced concrete walls, eighteen inches thick, sunk to pre-determined depth.

The horizontal screen pipe usually is manufactured from ⅜" steel plate which is perforated with oblong openings and slotted to size according to the sand and gravel content of the water bearing formation. The necessary lengths of the horizontal screen will vary depending upon the water bearing formation as to quality and quantity requirements.

Horizontal wells enjoy several advantages such as:

(1) Great lengths of large diameter screen may be installed, with a large total area of openings. These openings allow the water to enter the horizontal screen at a much lower velocity than vertical wells. Low entrance velocities prevent incrustation of the screen and result in a much longer well life.

(2) The horizontal orientation of the screens at the bottom of the water bearing formation allows maximum drawdown and full utilization of the aquifer capacity. Thus horizontal wells furnish the maximum possible productivity.

(3) An entire water supply plant is built under one roof, directly above the central caisson. The costs of power supply, collecting pipelines, and general maintenance are greatly reduced when compared to the same costs for a conventional vertical well field.

(4) In circumstances where property restrictions are severe, the interference of vertical walls with each other make then impractical for the development of the desired quantity of water. In many such instances, my single Multipurpose Water Plant solves the problem.

(5) The expansion of water needs can be accomplished by projecting additional laterals without having to shut down the water plant.

Industry and people are beset with a wide range of water problems pertaining to the quality of the water desired as well as the quantity. Today water is a manufactured commodity when blended and mixed with chemicals, and treated with various inorganic filters.

The embodiments illustrated show, in cross-section, the new improvements upon the basic design. Thereby full utilization of water is made by using sound engineering principles. Process tube lines are installed in the walls of the caisson at the time of construction. Each process tube line is directly connected to a horizontal screen pipe. The diameters of the process tube lines may be varied according to the requirements of each installation. During construction, the lower part of the inside of the caisson is used as a buttress for the hydraulic projection of the horizontal screen pipe. For this reason, it is necessary to maintain the high mechanical strength of this portion of the caisson. Where this is the case, the process tube lines are constructed of heavy gauge steel pipe and reinforced within the walls. The interior of the caisson can also be divided to form a vertical opening to join with a lateral to create a right angle well.

FIGS. 4 and 5 are sectionalized views of my new precast coarse sand and gravel packed lateral, or of material that is of the same particle size such as plastic, metal, charcoal or any combination thereof which includes any combination of organic or inorganic material. This lateral is designed specifically for maximum water supply development in fine sand and/or fine material aquifers. The lateral consists of the outer screen or main pipe 22 which maintains the mechanical strength of the lateral and aids in establishing a natural gravel pack; a 3-inch (more or less) layer 81–82 of carefully selected, coarse sand and gravel; and an inner screen 83 which serves as a conduit for the water flowing to the central caisson. The particle size in the gravel pack is chosen after preliminary study has indicated the size of coarse sand and gravel necessary to eliminate infiltration of sand into the inner screen.

Pre-casting the gravel pack allows each section of the screen to be custom built for the exact environment wherein it is to be installed. This feature of quality control results in maximum efficiency. The individual particles of coarse sand and gravel in the gravel pack are held in place by a special cementing process which permits maximum permeability and porosity.

In other embodiments of my invention, I pack the interior of each lateral with various combinations of charcoal, plastics, chemicals, minerals, gravel, sand, and silica.

This new water plant creates a revolutionary water control center which will produce cool clear water in large quantities. It utilizes the principles of the horizontal (radial) well and the vertical well in conjunction with the caisson. One new feature that makes this water plant so unique and practical is the construction within the caisson wall, a vertical water process tube line.

The process tube lines or vertical tubes 61–68 inclusive connect at right angles with the horizontal perforated screen pipes and form continuous isolated process tube lines when the valves (e.g. valve 32) (FIGS. 1–3 inclusive) in the base of the caisson are shut off.

Figure 7:
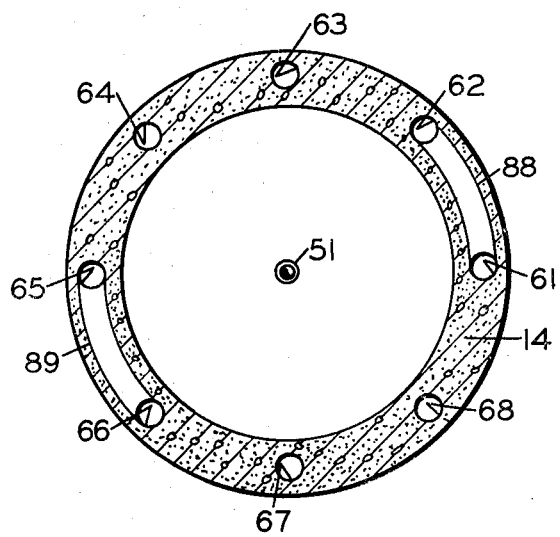
FIG. 7 is a horizontal sectional and fragmentary view similar to a horizontal section taken along a line just below the ground line shown in FIG. 1 and further illustrating a third embodiment of the invention.

In other embodiments of my invention I interconnect two or more of tubular openings 61–68 inclusive at the top and/or bottom of the caisson by lateral tubes either formed in the wall 14 or positioned within the space 15 of the caisson. Thus I have shown in FIG. 6 two pairs of the tubular openings interconnected near the bottom of the caisson. In FIG. 6 tubular openings 61 and 68 are shown interconnected by the pipe 86 and tubular openings 64 and 65 are shown interconnected by the pipe 87. Similarly, FIG. 7 shows two pairs of tubular openings interconnected near the top of the caisson. In FIG. 7 tubular openings 61 and 62 are shown interconnected by pipe 88 and tubular openings 65 and 66 are interconnected by pipe 89.

By using each individual process tube line or a combination thereof I achieve effectively better quality, more water, blending techniques with flexibility, a program of preventative maintenance without any shut-down time, lower installation and operational costs. Water in the aquifer blends the ground water and induced surface water. Both types are of different quality (chemical, hardness, etc.). With the individual process tube lines, these waters can be withdrawn from the aquifer without getting the full effect of blending if drawn directly into the caisson from various directions in the aquifer so as to secure selectively the desired type of water for any specified purpose.

The river intake line 54 (FIG. 1) can be connected to one of the process tube lines for direct use or blending with one of the many process tube lines for further treatment, standby for fire protection, recharge of ground water supply, infiltration gallery of selected sand and gravels, cooling, etc.

The use of deep well turbine pumps and submersible pumps gives the flexibility of positioning the pumphouse above flood stage level on top of caisson or below flood stage level.

When using submersible pumps such as 71 and 72 exclusively in all of the process tube lines 61–68 inclusive, only one standby pump is necessary, as the other will continue to function until the one process tube line requiring repair is repaired and/or replaced, and in the meantime can be pumped by connecting with another standby tube by a connecting medium. Based on individual requirements of industry or municipality, the caisson can be utilized for many purposes if the process tube lines with the submersible pumps are used when the valves are shut off in the lower inside part of the caisson. When all valves are closed, the caisson then can be used for storage, detention, or any other useful purpose.

*Operation*

The simplicity of the new design does not completely suggest the versatility and flexibility that is added to the many applications of new water plants constructed according to my invention. Each lateral with its associated vertical process tube lines, now becomes an entity that may be operated either independently of the rest of the water plant, or in conjunction with it. There is the further advantage of connecting horizontal screened radial pipes or laterals at the base of the caisson by horizontal tubes, so that a single submersible pump can take care of one or more process tube lines depending on the quantity desired.

Let us assume, for the purpose of illustration, that we have installed a horizontal well with eight laterals as shown radiating outward from the central caisson (FIG. 3). Any one or even two of these units may be shut down for maintenance operations without affecting the continuity of the water supply. Chemicals (liquids or solids), such as chlorine, may be injected through the process tube line out into the shut down lateral to prevent bacterial growths. Mechanical cleaning devices may be inserted to remove obstacles that may build up inside of the lateral. Best of all, it is not necessary to wait for trouble to start. A regular maintenance program may be initiated that will prevent the buildup of obstacles that create a reduction of well capacity. By treating each lateral independently in a regular maintenance program, it is possible to extend well-life of aquifer or screen pipe indefinitely without ever interrupting the continuity of the water supply.

The fact that each of the process tube lines is, in effect, a vertical well, with an immense screen area exposed in the water-bearing formation, opens up an entirely new field of applications for the new Multipurpose Water Plant. Any of these process tube lines may be used individually when by-passing the caisson for either the withdrawal or injection of water by closing the valve (e.g. the valves 32 and 36) inside the caisson. The opportunity of injecting water that has been used for cooling operations directly into the aquifer through a nonperforated pipe and drawing water through other laterals will be of interest to any industry or city. In this way, water that has been used for cooling is not lost for further operation, but is used to replenish the groundwater supply in the area. This warmer water will blend with the cool water present and be available for reuse at a lower temperature than that injected into the aquifer or blended within the caisson. Using warmer water for recharge purposes will increase yield during cold months of the year.

Today, with groundwater levels falling almost everywhere, embodiments of my invention are invaluable in replenishing and utilizing the groundwater supply. It is a very simple matter to combine the structure of a Multipurpose Water Plant constructed according to my invention with a raw water river intake. Surface water pumped from the river via pipe 54 may be injected into the aquifer through any of the laterals of my Multipurpose Water Plant and greatly increase the available supply. The natural filtering action of the formation that the water is injected into will improve the quality of the water. When the water in the river is warm, it will be cooled by blending with the natural cool ground-water. In the winter time, when the water in the river is cold, blending it with the stored warm ground-water will lower the temperature of the warmer ground-water and prevent a buildup of warmth in the formation. With this water plant, it is now possible to maintain local ground-water levels while conserving water by reusing and improving the quality of available supply. One of the process tube lines without pump can be used for observation purposes to gather samples for testing, static water level, low and high pump levels, etc.

Still another potential application of my Multipurpose Water Plant is the use of the central caisson as a storage or treatment tank by building on top the desired size to conform with need. While in most instances, ground-water is completely potable, it is often desirable to introduce chemicals for stabilization, softening, sterilization, or taste and odor control. In such a case, each process tube line becomes an individual vertical well with its own independent submersible pump. Each process tube line (vertical) pumps from its own horizontal screen pipe that is 12 inches in diameter, sometimes smaller or larger, and up to an average of 200 feet in length. In the central caisson, the water is stored or treated before being pumped out for distribution. Mechanical equipment can be installed to collect sediment or other foreign material in the caisson bottom and convey same to ground level for disposal.

The above are only a few of the possible applications of my Multipurpose Water Plant. Each unit built will fit the requirements of a specific job. The flexibility of the new basic design permits it to have a wide range of application.

It is to be understood that the above described embodiments of my invention are for the purpose of illustration only and various changes may be made therein without departing from the spirit and scope of the invention.

I claim:
1. A water supply system comprising
    a caisson positioned in an aquifer;
    a plurality of substantially horizontal perforated tubes extending substantially radially outward through the outer wall of said caisson;
    a plurality of vertical process lines each individually connected with one of said horizontal tubes; and
    a plurality of pumps wherein one of said pumps is positioned in each of said process lines for drawing water from said aquifer via one said horizontal tube.
2. The water supply system of claim 1 which includes a plurality of valves wherein one of said valves is connected to the inner end of each of said plurality of horizontal tubes for in each case alternatively allowing water to flow from the horizontal tube into the interior of the caisson or isolating said tube so that water from said tube is individually drawn from said tube through the process line associated therewith.
3. The structure of claim 1 in which a passage is provided in said caisson interconnecting at least a pair of said process lines.
4. The structure of claim 3 in which said passage is adjacent to the bottom of said caisson.
5. The structure of claim 3 in which said passage is adjacent to the top of said caisson.
6. The water supply system of claim 1 which includes at least one substantially horizontal generally imperforate tube extending substantially radially outward through the wall of said caisson and said generally imperforate tube having an opening adjacent the outer end thereof; and
    a pump for selectively moving water inwardly or outwardly through said imperforate tube.
7. The water supply system of claim 1 wherein said horizontal tubes are internally packed with granular material.
8. The water supply system of claim 1 wherein said horizontal tubes are internally packed with a granular material of the group consisting of charcoal, granular plastics, granular chemicals, granular minerals, gravel, sand, and silica and mixtures thereof.
9. The water supply system of claim 1 wherein said vertical process lines are formed within the wall of said caisson.
10. The water supply system of claim 1 which includes a vertical deep well pipe line extending vertically downward through the bottom of said caisson and a cooperating deep well turbine pump for pumping water upward therethrough.
11. A water supply system comprising
    a caisson positioned in an aquifer;
    a plurality of substantially horizontal perforated tubes extending substantially radially outward through the wall of said caisson;
    a plurality of vertical process lines formed within the wall of said caisson and wherein each of said process lines is connected with one of said horizontal tubes;
    a plurality of pumps wherein one of said pumps is positioned in each of said process lines for drawing water from said aquifer via one said horizontal tube;
    a plurality of valves wherein one of said valves is positioned on the inner end of each of said plurality of horizontal tubes for alternatively directing the flow of water from a horizontal tube into the interior of said caisson or from said tube through the process line associated therewith;
    at least one generally imperforate substantially horizontal conduit extending substantially radially outward through the wall of said caisson and having an opening adjacent the outer end of said imperforate conduit; and
    a pump for selectively moving water inwardly or outwardly through said imperforate conduit.
12. In a water supply system comprising
    a caisson positioned in an aquifer;
    a plurality of perforated tubes extending substantially radially outward through the wall of said caisson; and
    a plurality of vertical tubes wherein each of said vertical tubes is connected with one of said horizontal tubes;
    the improvement which comprises
    a plurality of pumps wherein one of said pumps is positioned in each of said plurality of vertical tubes for drawing water from said aquifer via one of said horizontal tubes.

References Cited by the Examiner

UNITED STATES PATENTS

| | | | |
|---|---|---|---|
| 551,646 | 12/1895 | Newsom | 166—50 |
| 1,588,920 | 6/1926 | Trahan et al. | 166—228 X |
| 1,992,718 | 2/1935 | Records | 166—229 |
| 2,126,575 | 8/1938 | Ranney | 166—50 X |
| 2,139,975 | 12/1938 | Utt | 166—228 X |
| 2,375,865 | 5/1945 | Nebolsine | 166—50 |
| 2,622,683 | 12/1952 | Silitch et al. | 166—50 X |
| 2,635,696 | 4/1953 | Asketh | 166—51 |

FOREIGN PATENTS

| | | |
|---|---|---|
| 1,268,783 | 6/1961 | France. |
| 965,750 | 6/1957 | Germany. |
| 973,766 | 6/1960 | Germany. |
| 717,229 | 10/1954 | Great Britain. |

OTHER REFERENCES

Ranney, Leo: "The World's Largest Water Well," reprint from American Waterworks Assn. Transactions, 1938, six pages.

CHARLES E. O'CONNELL, *Primary Examiner.*

D. H. BROWN, *Assistant Examiner.*